United States Patent [19]
Chakrabarty et al.

[11] Patent Number: 5,935,418
[45] Date of Patent: Aug. 10, 1999

[54] SLURRY HYDROPROCESSING

[75] Inventors: Tapantosh Chakrabarty; Ghosh Mainak, both of Calgary, Canada

[73] Assignee: Exxon Research and Engineering Co., Florham Park, N.J.

[21] Appl. No.: 08/920,555

[22] Filed: Aug. 29, 1997

[51] Int. Cl.⁶ ............................ C10G 45/46; C10G 45/04
[52] U.S. Cl. ................. 208/108; 208/216 R; 208/254 H; 208/251 H; 208/143; 208/110
[58] Field of Search ....................... 208/216, 108, 208/216 R, 251 H, 254 H, 110, 143

[56] References Cited

U.S. PATENT DOCUMENTS

| | | |
|---|---|---|
| 4,204,943 | 5/1980 | Metrailer et al. . |
| 4,210,538 | 7/1980 | Tantillo et al. . |
| 4,446,112 | 5/1984 | Den Hartog . |
| 4,937,051 | 6/1990 | Graven et al. . |
| 4,952,306 | 8/1990 | Sawyer et al. ...................... 208/216 R |
| 5,300,212 | 4/1994 | Winter, Jr. ................................. 208/89 |

FOREIGN PATENT DOCUMENTS

WO931679  9/1993  WIPO .

*Primary Examiner*—Helane Myers

[57] ABSTRACT

A reactor system is provided which is particularly suitable for hydroprocessing a heavy hydrocarbon under catalytic slurry hydroprocessing conditions. This reactor system includes a single reaction zone containing at least one filter element for the separation of liquid product from catalyst particles in the reaction zone. Means are provided for backwashing the filter element. Preferably, at least two filter elements are provided one of which is used for separation of product and the other for introduction of hydrogen into the reactor. Additionally, means are provided for switching the flow between the two filter elements thereby permitting continuous operation of the system.

3 Claims, 2 Drawing Sheets

SLURRY HYDROPROCESSING

FIELD OF THE INVENTION

This invention relates to the modification of heavy hydrocarbons such as bitumen from oil sands to render them pipelineable. More particularly, the invention relates to improvements in a reactor design for slurry hydroprocessing of heavy hydrocarbons.

BACKGROUND OF THE INVENTION

With the decrease in the reserves of conventional crude oils, there is increasing use of heavy hydrocarbons such as bitumen extracted from oil sands. These heavy hydrocarbons contain a wide range of materials including usually more than 50 wt. % of material boiling above 525° C., equivalent atmospheric boiling point.

In order to transport these heavy hydrocarbons to a point of use, the bitumen typically is mixed with a diluent such as natural gas condensate to reduce the viscosity of the bitumen for pipelining. Unfortunately, the supply of natural gas condensate may not keep pace with the continuing growth in use of such heavy hydrocarbons.

One technique for eliminating the need for diluent is to thermally process the heavy hydrocarbon in the presence of hydrogen and a catalyst slurry to produce a pipelineable product. In this process, catalyst particles are separated from the final liquid product in a separation zone removed from the conversion zone or reactor. The use of two zones result in increased costs for slurry hydroprocessing. Thus, there is a need for improvements in slurry reactor systems which are more efficient and essentially more economic.

SUMMARY OF THE INVENTION

Accordingly, in one embodiment of the present invention there is provided a novel slurry reactor in which both the hydroprocessing and the separation of product is achieved. The reactor comprises a reaction vessel arranged to contain the slurry. At least one first filter member is located in the reactor to be in contact with the slurry for introducing gaseous hydrogen into the slurry. At least one second filter is located within the reactor in contact with the slurry for filtering and removing product from the reactor. Means are provided for alternating the introduction of hydrogen and removal of product between first and second filter members at predetermined intervals thereby preventing a filter member from clogging with solids.

These and other embodiments of the present invention will become apparent upon reading the detailed description of the invention.

DETAILED DESCRIPTION OF THE INVENTION

Figure 1:
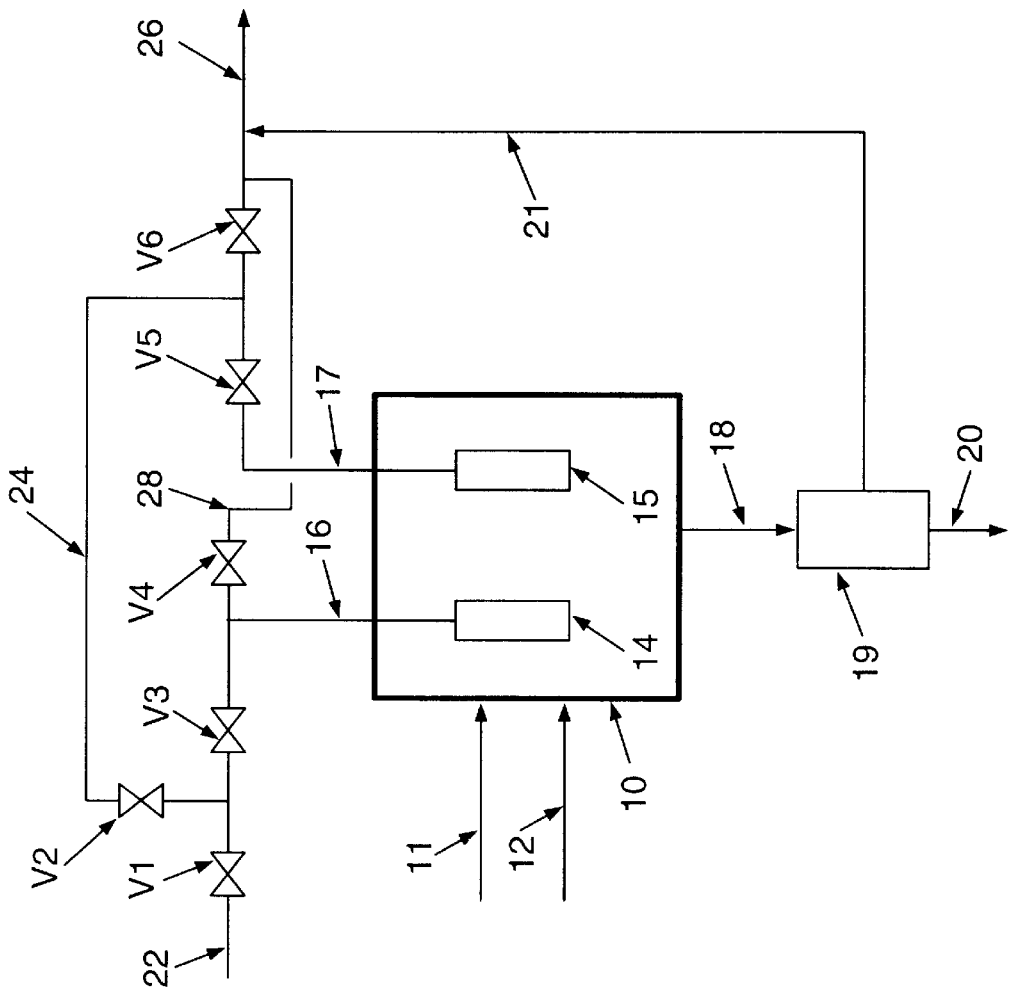
FIG. 1 is a simplified process diagram illustrating one embodiment of the present invention.

The reactor system described herein is particularly suitable for the hydroprocessing of heavy hydrocarbons under catalytic slurry hydroprocessing conditions in a single reaction zone and for the continuous separation of liquid product from catalyst particles in that zone and removal of the liquid product therefrom. The reactor system is depicted schematically in FIG. 1 in which line 11 is provided for the introduction of a heavy hydrocarbon, such as bitumen, into the slurry reactor 10, Line 12 is also provided for introducing catalyst or makeup catalyst into the reactor 10, as the case may be. Disposed in the slurry in the reactor 10 is at least one first filter member 14 and at least one second member filter 15. Conduits 16 and 17 are operably connected to the filters 14 and 15 respectively and the fluid conduits 28 and 24 for the introduction of hydrogen and removal of liquid from the reactor 10. Line 18 is provided for removing a mixture of the liquid and catalyst when required. Line 18 communicates with a liquid solid separation zone 19.

Line 22 is provided for introducing hydrogen from a source (not shown) into the system and line 26 is provided for removing liquid product to a product store (not shown). Both lines 22 and 26 communicate with conduits 24 and 28.

One valving arrangement for the control of the direction of flow of fluids is shown in FIG. 1. In operation, when the valves V2 and V4 are closed and valves V1 and V3, V5, V6 are open hydrogen is introduced via line 22 through line 16 and through the filter 14 generating fine bubbles within the slurry. Under hydroprocessing conditions, product is formed within the reactor 10 and is filtered by filter 15 and passed via conduit 17 and 26 to a liquid product storage. At predetermined time intervals, the functions of filters 14 and 15 are reversed by closing valves V3 and V6 and opening valves V1, V2, V4, and V5. Under these conditions, hydrogen is passed via lines 22, 24 and 17 through filter 15 to the reactor 10, thereby purging filter 15 of any solids built up during the filtering operation. Under this cycle, filter 14 separates the liquid product from the solids and the liquid product passes via line 16, 28 and 26 to the product storage. At yet another predetermined time interval, the flow of hydrogen and the product is reversed, thereby permitting continuous operation of the system. Periodically spent catalyst is removed as required from the reactor 10 via line 18 and separated in the liquid solid separator 19. The spent catalyst is then removed from the separator 19 via line 20 while liquid is recycled or removed via line 21. Make up catalyst is added via line 12 as required.

Figure 2:
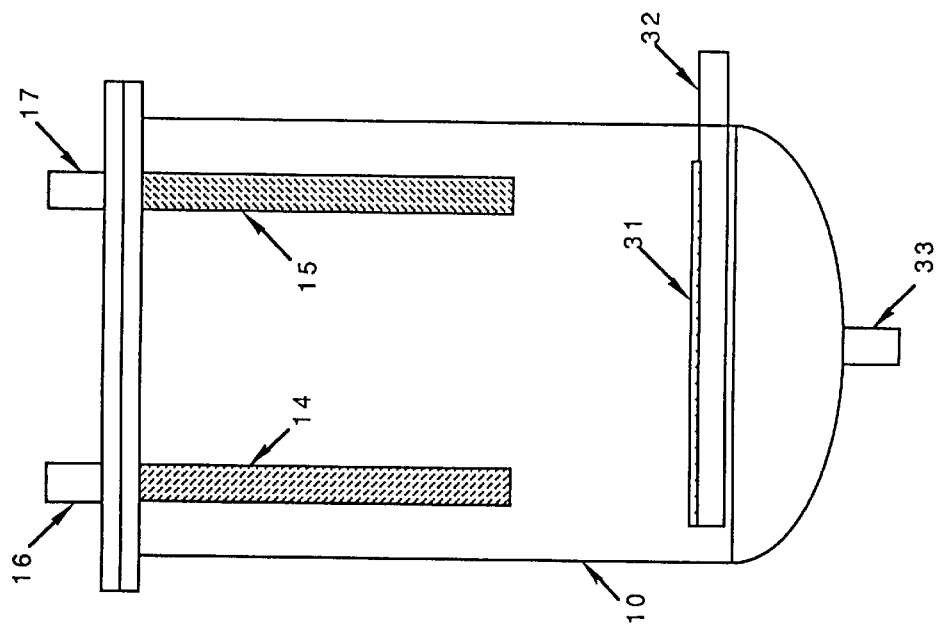
FIG. 2 is a diagramatic side view of one configuration of the reactor of the present invention.

FIG. 2 shows an alternate embodiment of the present invention in which gas sparger 31 is located in the bottom of the reactor 10 for introducing primary or supplemental hydrogen via line 32. Hydrocarbon feed is introduced through line 33. Line 33 can also be used as an alternate entry point for supplemental hydrogen.

Figure 3:
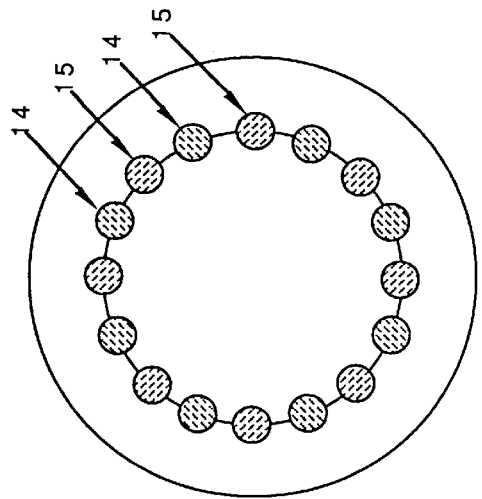
FIG. 3 is a schematic illustration of an arrangement of a plurality of filter members in a slurry reactor in accordance with the present invention.
Figure 4:
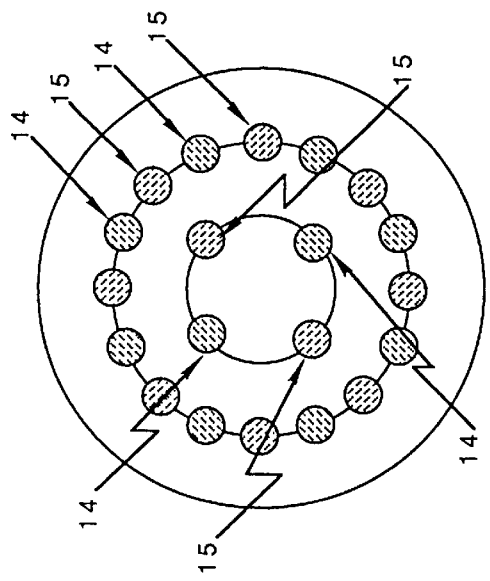
FIG. 4 is yet another schematic illustration of an arrangement of a plurality of filter members in a slurry reactor according to the present invention.

As will be readily appreciated, it is particularly preferred in the practice of the present invention to provide reactor 10 with a plurality of first filters 14 and a plurality of second filters 15. Indeed, it is generally preferred to provide equal numbers of each of first and second filters. These filters can be disposed in various patterns within reactor 10 although it is particularly preferred to dispose of them in a circular pattern such as that shown in FIG. 3, alternating between first filters 14 and second filters 15 or in concentric arrangements such as that shown in FIG. 4 with alternating first and second filters.

The first and second filter members 14 and 15 used in the present invention may be made of any material that is capable of withstanding temperature and pressure conditions that exist under hydroprocessing operations. In general, it is particularly preferred that the filter elements be fabricated from sintered porous metal or ceramics. As is shown in FIG. 2 the porous filter elements are typically tubular in shape. The average pore size of the filter elements is selected such that the catalyst concentration in the filtered liquid product meets the product specification. Typically, the average pore size should lie between 0.5 and 50 $\mu$m and preferably between 5 and 20 $\mu$m.

In yet another embodiment, all the filters may be used in the filtering mode. Thus, for example, in the FIG. 2 embodiment hydrogen may be introduced into vessel 10 via line 32 and sparger 31. Liquid product is filtered by both filters 14 and 15 and removed via conduits 16 and 17. Intermittantly the flow of hydrogen through conduit 32 and the removal of liquid product is through conduits 16 and 17 stopped and hydrogen is backwashed through the filters 14 and 15 via conduits 16 and 17.

As will be readily appreciated, various automated timers or sensors may be employed in conjunction with various types of flow controllers for periodically reversing the flow of materials through the reactor system at pre-determined intervals. For example, a sensor can be employed to measure a pressure drop in the system and flow controllers can be employed such as computers and the like, to reverse the flow at a point in time when a predetermined pressure drop is exceeded.

The reactor system of the present invention is particularly suitable for use in modifying the viscosity of heavy hydrocarbons such as those which contain a substantial portion, for example greater than about 50 vol. %, of material boiling above 525° C., equivalent atmospheric boiling point. Indeed, of particular interest are the heavy hydrocarbon oils extracted from oil sands, most particularly Athabasca and Cold Lake oil sands. Typically, such heavy hydrocarbons have viscosities exceeding 5,000 centipoise at 40° C. and specific gravities close to or greater than 1.

The finely divided solid catalyst utilized in forming the slurry in the system with the hydrocarbon is not critical and in general will be one of any of the particulate catalyst used in slurry hydroprocessing of heavy hydrocarbons. For example, the catalyst will be selected from those having a catalytically active metal component such as vanadium, chromium, iron, cobalt, nickel, niobium, molybdenum, tungsten and mixtures thereof These metals are typically deposited on a carrier such as a refractory inorganic oxide metal carrier including alumina, silica, zirconia, magnesia, titania, and mixtures thereof The particle size of the catalytic solid will be generally less than about 80 microns in diameter and generally in the range of about 0.5 to 50 microns in diameter.

Typically the catalyst concentration in the reactor liquid, will be in the range of about 100 ppm by weight to 20 wt. % and preferably in the range of 0.10 wt. % to 10 wt. %.

The hydroconversion conditions typically employed require maintaining the reactants from about 400° C. to about 460° C. and preferably from about 420° C. to about 450° C. at a hydrogen partial pressure ranging from about 800 to about 1500 psig and preferably from about 1000 to about 1200 psig.

For the purposes of utilizing the reactor system of the present invention to render the heavy hydrocarbon pipelineable it is particularly preferred to conduct the hydroconversion for a time sufficient to lower the viscosity of the heavy hydrocarbon at 40° C. within the range of about 20 to 60 centipoise.

The invention will now be further illustrated in the following example.

EXAMPLE 1

A one-liter glass vessel was fitted with two 7 $\mu$m microporous metal elements that served as first and second filters. The surface area of each element was 0.27 sq. feet. The vessel was charged with 600 ml of slurry prepared using light Bayol oil and particulate solid having a particle size of around 1 to 50 $\mu$m. Bayol oil has a viscosity of 3 cSt @ 25° C. which is similar to that of the slurry hydroprocessor liquid at reactor temperature. The concentration of solid in the slurry was 6 wt. %. In a given cycle in this experiment, clean Bayol oil was pumped continuously through the vessel at a rate to provide a liquid residence time in the reactor at about 1 hour, again similar to what would be encountered in an actual slurry hydroprocessing operation. Nitrogen, which was used instead of hydrogen, was bubbled through the first filter element and the liquid that passed through the second filter element was collected. The rates of Bayol oil injection and filtrate production were matched so that at all times slurry within the reactor had a constant solid concentration. The pressure drop across the filter element was not allowed to exceed 17 psi because of the pressure limitations of the glass vessel. The bubbling of nitrogen through first filter element and the production of filtrate through the second filter element continued in a cycle until the filtration rate declined to a predetermined level. At that time, the flow to the filter elements were switched so that the second filter element was used for injecting the nitrogen in the reaction vessel and the first filter element was used for removing liquid from the vessel. Switching the filter element reverses the flow of gas that had the effect of cleaning the filter element from the previous filter cycle. Twenty-one such cycles were completed by switching the roles of the first and second filter elements twenty-one times. The filtrate in each cycle was a clear fluid, tinted slightly by the residual hydrocarbon and the catalyst. In twenty-one cycles, 6.6 liters of filtrate were collected over a period of 11 hours with the filtrate showing no measurable traces of catalyst as determined by Millipore analysis using a 0.22 $\mu$m filter.

What is claimed is:

1. A process for slurry hydroprocessing a heavy hydrocarbon under slurry hydroprocessing conditions to an upgraded product which comprises:

adding a heavy hydrocarbon and particulate catalyst to a reaction vessel containing at least one first filter element disposed to be in contact with the hydrocarbon and catalyst;

introducing hydrogen into the vessel under hydroprocessing conditions to form an upgraded product;

filtering upgraded products formed in the vessel through the first filter element for removal from the slurry;

at a predetermined time intervals stopping the filtering and removing of product through the first filter element and introducing hydrogen through the first filter element whereby hydroprocessing and separation of products, are conducted in a single vessel.

2. The process of claim 1 wherein the vessel contains at least one first filter element and at least one second element in contact with the hydrocarbon and catalyst and wherein hydrogen is introduced into the vessel through the second filter element and upgraded product is filtered and removed through the first filter element and at predetermined time intervals alternating the introduction of hydrogen and the filtering between the first and second filter elements whereby hydroprocessing and separation of products are conducted continuously in a single vessel.

3. The process of claim 2 including adding sufficient hydrocarbon to maintain the amount of hydrocarbon and catalyst in the vessel substantially constant.

* * * * *

UNITED STATES PATENT AND TRADEMARK OFFICE
CERTIFICATE OF CORRECTION

PATENT NO : 5,935,418
DATED : August 10, 1999
INVENTOR(S): Tapantosh Chakrabarty; Ghosh Mainak It is certified that error appears in the above-identified patent and that said Letters Patent is hereby corrected as shown below:

In the listing of inventors "Ghosh Mainak" should read —Mainak Ghosh—

Signed and Sealed this

Fourteenth Day of March, 2000

Attest:

Q. TODD DICKINSON

*Attesting Officer*  *Commissioner of Patents and Trademarks*